Jan. 31, 1933.  W. O. MEISSNER  1,895,637
SYNCHRONOUS MOTOR
Filed March 28, 1931   3 Sheets-Sheet 1

Inventor:
William O. Meissner.

Jan. 31, 1933.   W. O. MEISSNER   1,895,637
SYNCHRONOUS MOTOR.
Filed March 28, 1931   3 Sheets-Sheet 2
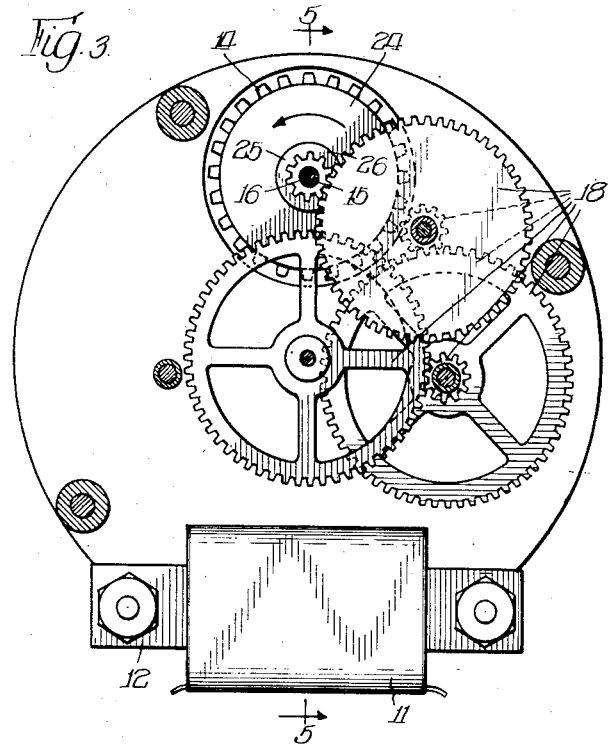
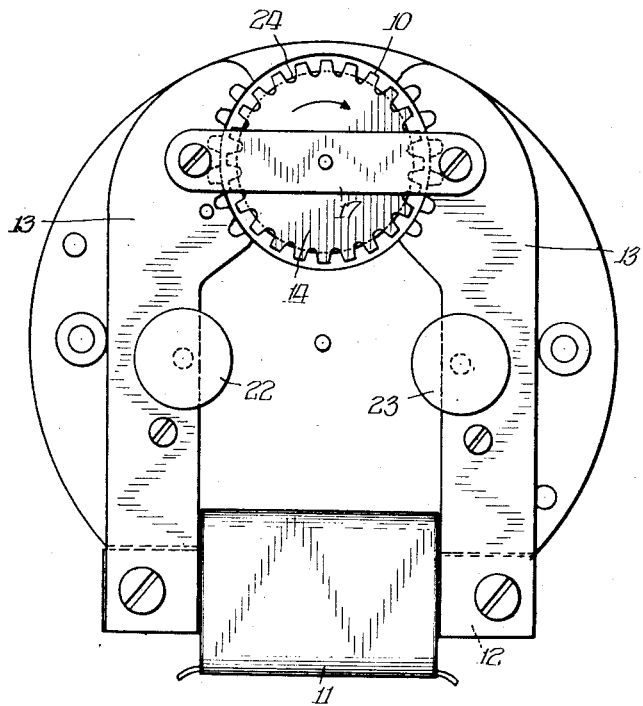
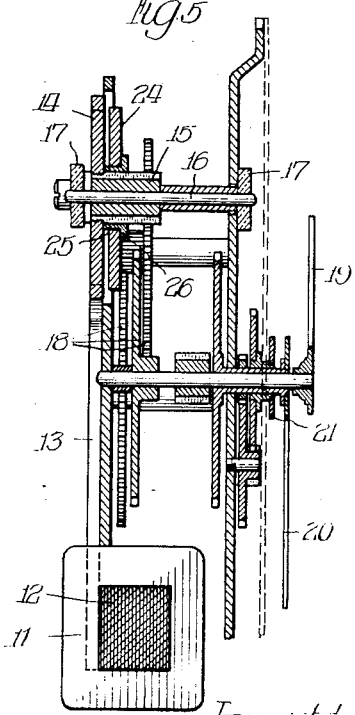
Inventor:
William O. Meissner,
By Romerel Grist + Warden Jan. 31, 1933. W. O. MEISSNER 1,895,637
SYNCHRONOUS MOTOR
Filed March 28, 1931 3 Sheets-Sheet 3

Inventor:
William O. Meissner.
By

Patented Jan. 31, 1933

1,895,637

UNITED STATES PATENT OFFICE

WILLIAM O. MEISSNER, OF HINSDALE, ILLINOIS, ASSIGNOR TO MEISSNER MANUFACTURING COMPANY, OF CHICAGO, ILLINOIS, A CORPORATION OF ILLINOIS

SYNCHRONOUS MOTOR

Application filed March 28, 1931. Serial No. 525,937.

This invention has to do with synchronous motors of the non-self-starting type, and is particularly concerned with the provision of improved means for overcoming the difficulty usually experienced in trying to start such motors.

The improvements which constitute the invention, while generally applicable to small sized synchronous motors used for various purposes, are of especially great commercial value at the present time in their application to the motors used for operating clocks.

The principal object of the invention is to provide improved means for bringing the armature of a synchronous motor into step when the armature is either manually or automatically rotated to start the motor.

Another important object of the invention is to provide improved means for automatically rotating the armature of a non-self-starting synchronous motor to start the latter.

Other objects and advantages of the invention will be apparent to those skilled in the art upon a full understanding of the construction, arrangement and operation of the improvements.

One form of the invention is presented herein by way of exemplification, but it will of course be appreciated that the invention is susceptible of embodiment in other structurally modified forms coming equally within the scope of the appended claims.

In the accompanying drawings:

Fig. 3 is a vertical section through the mechanism, taken on the line 3—3 of Fig. 2;

Fig. 4 is a back view of the mechanism;

Fig. 5 is a vertical section through the mechanism, taken on the line 5—5 of Fig. 3;

Figure 1:
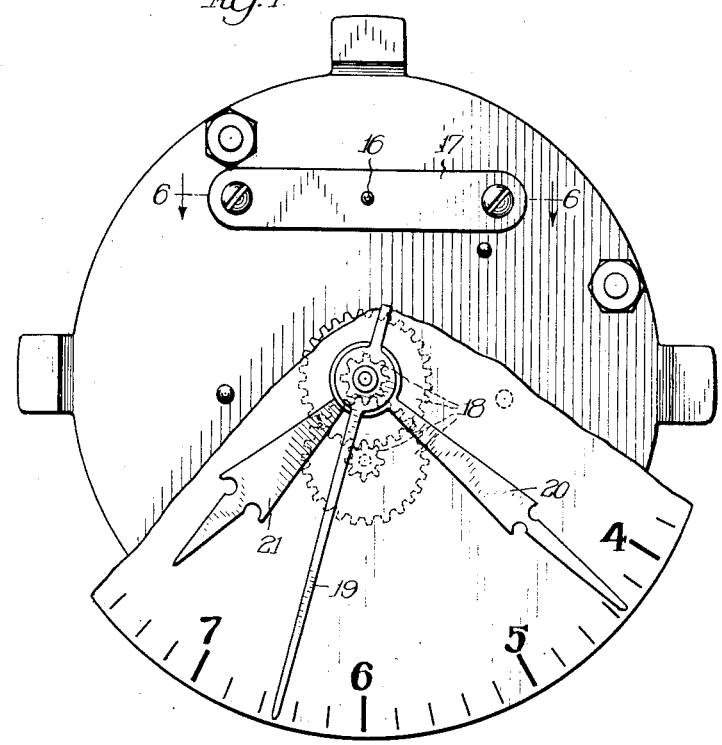
Fig. 1 is a partially broken away front view of a clock mechanism which is operated by a synchronous motor constructed in accordance with the invention.
Figure 2:
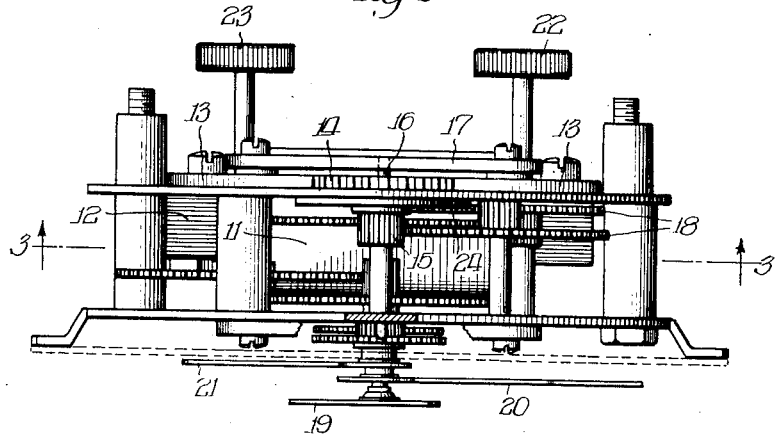
Fig. 2 is a plan view of the mechanism.
Figure 6:
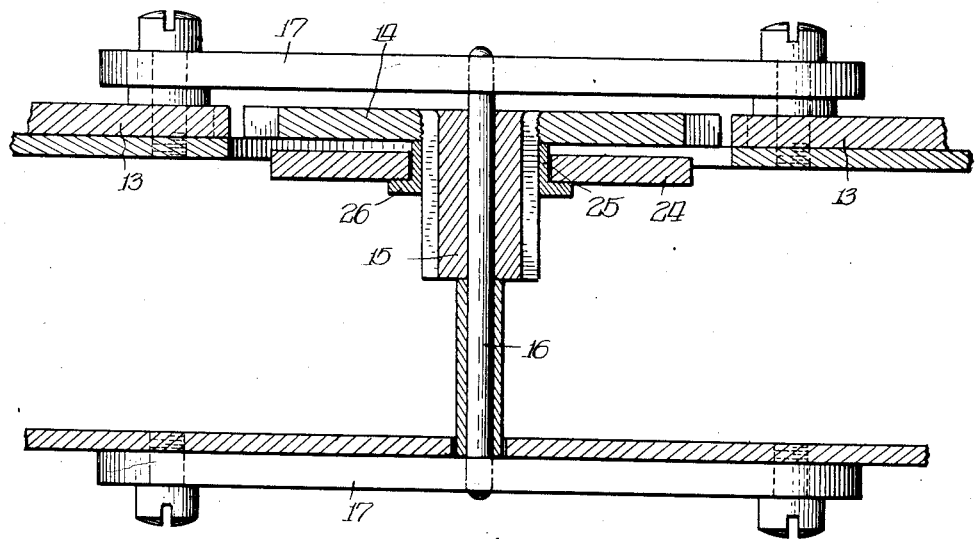
Fig. 6 is a horizontal section through the operating motor, taken on the line 6—6 of Fig. 1, showing the armature and fly wheel assembly.

The clock mechanism shown in the drawings is operated by a synchronous motor 10. The motor 10 includes a coil 11, a core 12, a pair of pole pieces 13 and an armature 14. The armature 14 of the motor is fastened to a pinion 15, and the pinion 15 is in turn secured to a shaft 16 which is journaled in apertures in two spaced bearing strips 17. The pinion 15 drives a time gear train 18 of ordinary construction, and the train 18 is connected in the usual way with a second hand 19, a minute hand 20 and an hour hand 21. A finger piece 22 is attached to one of the countershafts in the train for use in starting the rotation of the armature, and another finger piece 23 is connected to a frictionally driven gear in the train for use in setting the minute and hour hands.

The present invention resides in the provision of a fly wheel 24 of novel construction, arrangement and operation. The fly wheel 24 is journaled on a collar 25 in coaxial slightly spaced relation to the armature 14. The collar 25 encircles the pinion 15 and is provided with an annular rib 26 at one end which limits the movement of the fly wheel 24 in a direction away from the armature. The fly wheel 24 is made of soft readily permeable magnet iron or steel, and the collar 25 is also preferably made of the same material.

When the current is shut off, the fly-wheel 24 will rotate freely on the collar 25. When the current is turned on however, the fly wheel will be influenced by the current in such a way as to yieldingly resist rotation relative to the armature.

This magnetically caused tendency of the free fly wheel 24 to resist rotation relative to the armature 14 permits easy starting of the latter. As is well known in synchronous motors of the inherently non-self-starting type, the armature must be caused to rotate in the field at approximately synchronous speed for an appreciable length of time in order to afford it an opportunity to move into step. Others have endeavored to facilitate the starting of such motors by using fly wheels connected in various ways to the armatures or to the shafts or pinions associated either directly or by gearing with the armatures. Some have fastened the fly wheels rigidly with respect to the armatures; others have employed springs to give a somewhat flexible connection therebetween; others have used friction clutches for that purpose; while still others have used fluids in contact with free fly wheels to obtain the desired flexibility.

All such prior art arrangements are open to one or more objections which are well known to those skilled in the art. When a rigid connection is used, for instance, the non-flexibility of the same frequently results in the inertia of the fly wheel preventing the armature from slipping into step, while when a frictional connection of some sort is used, the friction and the resulting flexibility is likely to vary considerably with changes in climatic and other conditions. Furthermore, such arrangements, and particularly those of the friction type, are difficult to construct and are costly.

With the magnetic arrangement of the present invention, in which no frictional connection at all is employed, and in which the tendency of the free fly wheel to yieldingly resist rotation relative to the armature is due to the effect of the field, results will be found to be uniformly excellent. When the finger piece 22 is turned to spin the armature 14 at an initially greater than synchronous speed, the magnetic effect on the fly wheel 24 will cause the latter to spin with the armature as a unit. As the armature and fly wheel gradually decelerate and reach approximately synchronous speed, the armature will shift circumferentially with respect to the fly wheel far enough to move into step, and the fly wheel will thereupon assume the same speed of rotation as the armature, always keeping in axially spaced relation to the latter.

The remarkable efficiency of the magnetically actuated fly wheel 24 permits the latter to be made quite light and small. While the invention is of course in no way limited in its application to any particular sizes, shapes or proportions, it may be helpful to mention that very good results have been obtained by employing, with a twenty-four tooth armature of 1″ diameter and $\frac{1}{16}$″ thickness, a plain round fly wheel of $\frac{7}{8}$″ diameter and $\frac{1}{16}$″ thickness journaled on a collar of $\frac{1}{4}$″ outside diameter, which collar permits of a repulsive separation of about $\frac{1}{32}$″ between the fly wheel and the armature.

Figure 7:
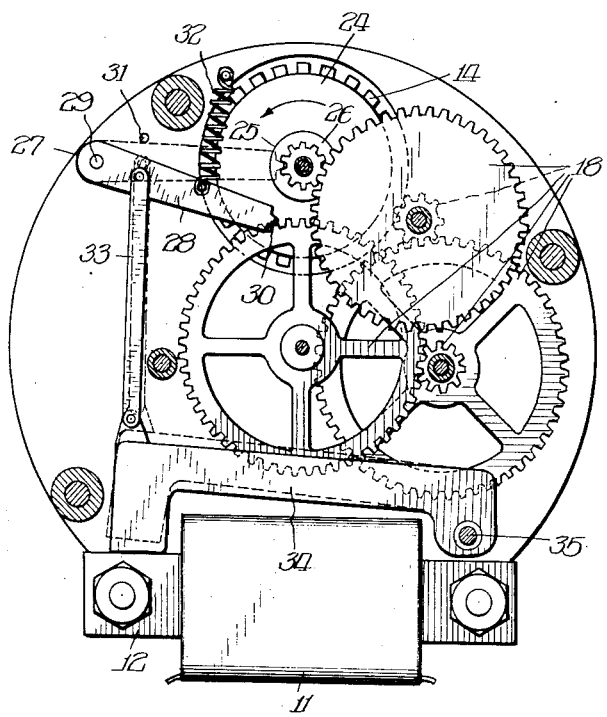
Fig. 7 is a vertical section corresponding to Fig. 3, showing the motor equipped with an automatic starting device constructed in accordance with the invention.

Another novel synchronous motor feature is shown in Fig. 7. This feature—which may be used or not, as desired, with the previously described magnetic fly wheel feature—consists of a device 27 for automatically starting the armature 14 whenever the current is turned on.

The starting device 27 consists of a finger 28 which is pivotally mounted at one end on a pin 29 and is provided at the other end with one or more teeth 30 for interfitting engagement with the teeth on the pinion 15. The upward pivotal movement of the finger 28 is limited by a stop 31 in a position wherein the tooth 30 is in engagement with the pinion. When the current is turned off the finger is moved into that position and held there by a tension coil spring 32. The finger 28 is connected by a link 33 with one end of a bar 34, and the other end of the bar 34 is pivotally mounted on a pin 35 in a position just above the core 11 of the motor. When the current is turned on, the free end of the bar—which is made of magnetic material—is drawn downwardly by the core and the free end of the finger is in consequence pulled down, thereby spinning the pinion 15 at a speed preferably a little in excess of synchronous speed. As long as the current remains on, the finger 28 will be held out of engagement with the pinion 15, but, as soon as the current is interrupted, the finger will spring back into engagement with the pinion in readiness to start the latter.

The improvements herein disclosed and claimed are obviously not restricted in their application to synchronous motors in clock mechanisms. They may be used effectively with synchronous motors in other kinds of mechanisms employed for widely different purposes.

I claim:

1. In a synchronous motor, means for producing a magnetic field, an armature in the field, and a free magnetically actuated fly wheel adjacent the armature.

2. In a synchronous motor, means for producing a magnetic field, a rotatable armature in the field, and a relatively rotatable fly wheel of magnetic material positioned adjacent the armature in coaxial relation to the same, said fly wheel being acted upon magnetically by the field to yieldingly resist rotation relative to the armature.

3. In a synchronous motor, means for producing a magnetic field, a disk armature positioned in the field, a disk fly wheel of magnetic material rotatably mounted in slightly spaced coaxial relation to one face of the armature, and means for limiting axial movement of the armature and fly wheel away from each other, said fly wheel being magnetically influenced to aid in bringing the armature into synchronism when rotated.

4. In a synchronous motor, means for producing a magnetic field, an armature in the field, a pinion connected with the armature, a magnetic fly wheel rotatably mounted on the pinion in slightly spaced coaxial relation to the armature, and a collar on the pinion for limiting axial movement of the fly wheel away from the armature, said fly wheel being magnetically influenced to aid in bringing the armature into synchronism when rotated.

5. In a synchronous motor, means for producing a magnetic field, an armature in the field, a pinion supporting the armature, a shaft supporting the pinion, a collar sleeved over a portion of the pinion, a magnetic fly wheel rotatably mounted on the collar, and a flange on one end of the collar for limiting the extent of axial separation of the fly wheel relative to the armature, said fly wheel being magnetically influenced to aid in bringing the armature into synchronism when rotated.

6. In a synchronous motor, means for producing a magnetic field, an armature, and means comprising a fly wheel of magnetic material for utilizing the magnetic influence of the field to decrease the rate of deceleration of the armature when the latter is launched at a super-synchronous speed.

7. In a synchronous motor, means for producing a magnetic field, an armature, and a free magnetically influenced fly wheel for the armature.

8. In a synchronous motor, means for producing a magnetic field, a rotatable armature in the field, and a relatively rotatable fly wheel of magnetic material positioned adjacent the armature in coaxial relation to the same, said fly wheel being acted upon magnetically by the field to aid in bringing the armature into synchronism when rotated.

9. A synchronous motor comprising means for producing a magnetic field, an armature shaft, a rotor member supported on said shaft in the influence of said field, and an inertia member also supported on said shaft and magnetically connected to said rotor so as to be adapted to be driven thereby, one of said members being operatively connected to said shaft and the other of said members being loose on said shaft to permit relative rotation of said members.

10. A synchronous motor comprising means for producing a magnetic field, an armature shaft, a rotor member fixed on said shaft in the influence of said field, and an inertia member loosely supported on said shaft and magnetically connected to said rotor so as to be driven thereby.

In testimony whereof I have hereunto subscribed my name.

WILLIAM O. MEISSNER.